(No Model.)
P. DIEHL.
ELECTRIC MOTOR.
No. 411,982.　　　　　　　　Patented Oct. 1, 1889.
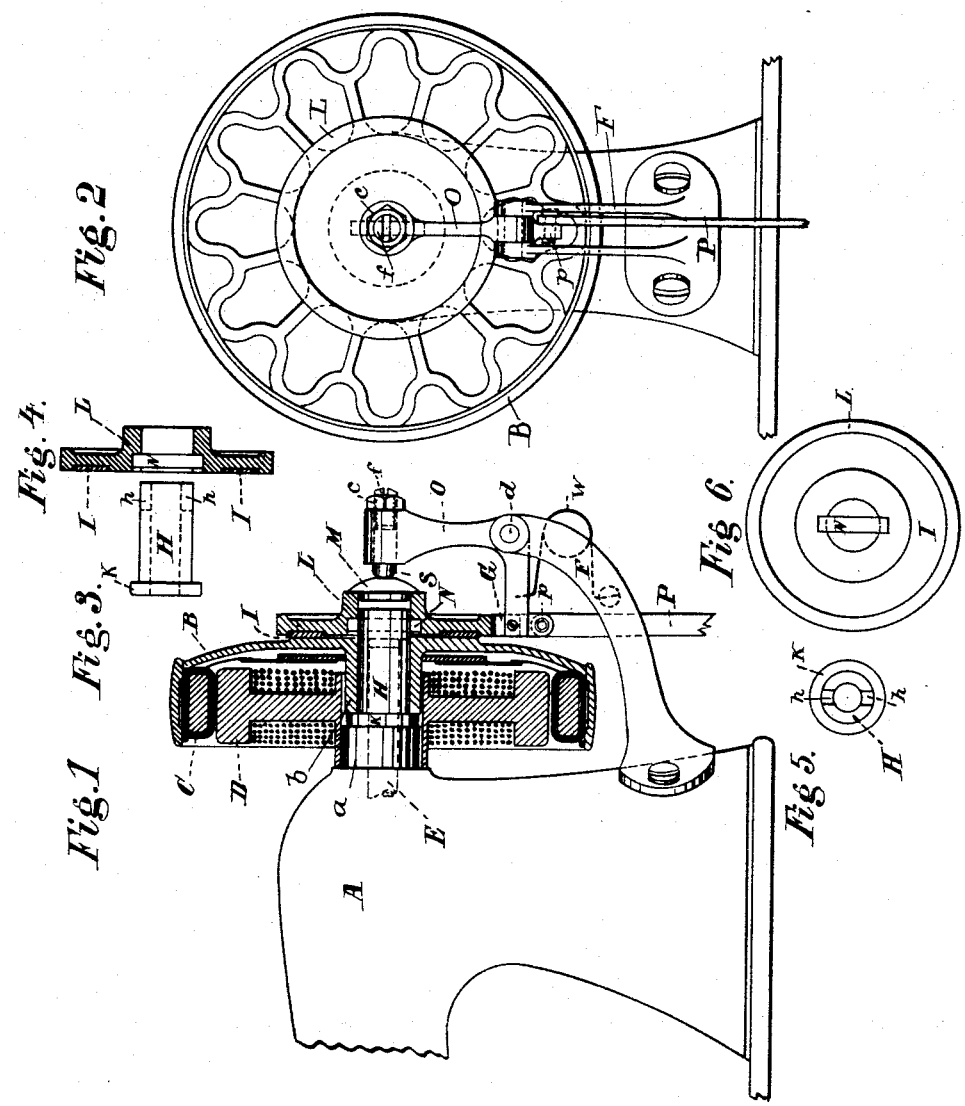
WITNESSES:　　　　　　　　INVENTOR

UNITED STATES PATENT OFFICE.

PHILIP DIEHL, OF ELIZABETH, NEW JERSEY.

ELECTRIC MOTOR.

SPECIFICATION forming part of Letters Patent No. 411,932, dated October 1, 1889.

Application filed April 20, 1889. Serial No. 307,917. (No model.)

*To all whom it may concern:*

Be it known that I, PHILIP DIEHL, a citizen of the United States, residing at Elizabeth, in the county of Union and State of New Jersey, have invented certain new and useful Improvements in Electric Motors, of which the following is a specification, reference being had therein to the accompanying drawings.

In the operation of an electric motor it takes some little time when the current is turned on by closing the circuit for the motor to attain its full speed, and if the motor be frequently stopped, as is frequently necessary if it be directly connected with the machine to be driven, considerable time is lost. Moreover, it frequently takes a stronger current to start a machine than it does to drive it after being started, and the operator is thus put to the trouble of regulating or changing the current after the machine has attained its desired speed.

The object of my invention is to obviate the necessity of stopping an electric motor when the machine to be driven thereby is stopped.

To this end I provide a simple and effective device whereby a sewing or other machine may be operatively connected when desired with a constantly-running electric motor without the use of belts or gearing, the movements imparted to such machine from the motor being capable of being regulated or quickly arrested at the will of the operator.

The construction of the electric motor to which my invention is to be applied is or may be similar to that shown and described in my patent, No. 356,576, dated January 25, 1887, said motor comprising a stationary field-magnet and a revolving armature surrounding said magnet and forming part of a fly-wheel, within which is also inclosed the commutator of the motor.

In the present instance the hub of the rotary armature and fly wheel is mounted loosely on a sleeve rigidly attached to the shaft to be driven. A friction or clutch disk is attached to said sleeve, so as to rotate therewith, but is capable of a sliding movement thereon, so as to be engaged with or disengaged from the fly or armature wheel, and means are provided for pressing said disk against the constantly-running fly or armature wheel when desired, so that the movements of said wheel will be imparted to said disk and to the shaft with which said disk is connected. Thus the full running-power of the motor may be instantly utilized in starting the machine, and the loss of time incidental to the use of electric motors directly connected with sewing and other machines requiring frequent stoppages is thus avoided. A brake is provided to stop the rotation of the clutch-disk when the said disk is released from the fly or armature wheel, said brake being preferably on the lever which forces said disk against said wheel, but may be on a separate arm or lever.

In the accompanying drawings, Figure 1 is a sectional elevation showing part of a sewing-machine arm with my invention applied thereto. Fig. 2 is a rear view of the same. Figs. 3, 4, 5, and 6 are detail views of the sleeve and the friction or clutch disk.

A denotes the arm of a sewing-machine having the hub $a$, and D is a stationary field-magnet secured to said hub.

C is a ring or Gramme armature secured within the fly or armature wheel B and surrounding the field-magnet. The wheel B is provided with a hub $b$, loosely mounted on a sleeve H, attached to the driving-shaft E of the sewing-machine, said shaft extending rearward through the bearing-hub $a$ into said sleeve, and the latter being provided with an annular flange K, interposed between the hubs $a$ and $b$.

L is a friction-disk mounted loosely on the sleeve H, so as to slide thereon, but connected to said sleeve to rotate therewith by means of a key N, attached to said disk and fitting in slots or notches $h$ in the rear end of said sleeve, said slots or notches being of sufficient depth to prevent said key from becoming disengaged from said sleeve when the friction or clutch disk L is disengaged from the armature-wheel. The inner face of the disk L is provided with a friction ring or washer I of leather, pasteboard, or other suitable material, and the wheel B is provided with a flattened outer face, against which said washer is pressed when the shaft E is to be driven. The said disk L is also provided with a button M, fitted in a central opening therein, said button having, preferably, a rounded outer face to be engaged by the rounded inner end of an engagement-plug S, carried by a bell-crank clutch-lever O, pivoted at *d* to the upper end of an arm F, attached to the sewing-machine arm A. The plug S is prevented from slipping backward by the screw *f*, locked by the set-nut *c*.

The horizontal arm of the lever O is provided with a friction or brake block G, arranged to engage the flattened edge or periphery of the clutch-disk L, said block being normally pressed against the edge of said disk by the spring *w*, attached to the arm F and the horizontal arm of the lever O, said arm having on its under side a depending lug *p*, to which is joined a rod P, to be connected with a treadle, (not shown;) or the said lever may have an operating-handle.

The commutator inclosed within the armature-wheel and the electrical connections of the motor are or may be substantially the same as those shown in my patent, No. 356,576, hereinbefore referred to.

The operation of my device is as follows: When the shaft E is at rest, the brake-block G will be pressed against the rim of the disk L by the spring *w*, and the button M will be relieved from the pressure of the plug S, so that there will be little or no frictional contact between the washer I of the clutch-disk L and the flattened outer face of the fly or armature wheel B. The current being turned on by closing the circuit, the wheel B will be in constant rotation, and when it is desired to start the shaft E and the machine driven thereby the lever O is operated by the treadle-rod P, or otherwise, to press the plug S against the button M, thus relieving the brake G from the rim of the clutch-disk L and forcing the washer I, carried by said disk, against the flattened outer face of the rotating wheel B, so that the movements of said wheel will be imparted to the said clutch-disk, and from the latter to the shaft E, with which said disk is connected. The rotative speed of the shaft E may be regulated according to the pressure given to the clutch-disk, as will be obvious; and to stop the shaft E and the machine driven thereby the lever O is entirely released, when the spring *w* will relieve the pressure of the plug S from the button M and force the brake-block G against the rim of the clutch-disk L, and thus at once arrest the rotation of the said disk and of the shaft connected therewith.

I do not wish to be understood as limiting my invention to the particular details herein shown and described, as such details may be varied within the province of mechanical skill without departing from the essential features of my invention. The brake to arrest the movements of the machine when the clutch-disk is released may be constructed separate from the clutch-lever O, if desired.

I claim—

1. The combination, with a shaft to be driven, of an electric motor the wheel of which is loosely mounted on said shaft, a clutch-disk connected with said shaft so as to rotate therewith and adapted to be engaged with said wheel, and an arm or lever for forcing said disk and wheel into frictional contact with each other when desired.

2. The combination, with a shaft to be driven, of an electric motor comprising a stationary field-magnet and a rotary armature, forming part of a wheel which is loosely mounted on said shaft, a clutch-disk connected with said shaft to rotate therewith and adapted to be frictionally engaged with said wheel, and means for forcing said disk and wheel into frictional contact with each other when desired.

3. The combination, with a shaft to be driven, of an electric motor the wheel of which is loosely mounted on said shaft, a clutch-disk rotatively connected with said shaft and adapted to be engaged with said wheel, means for causing a frictional engagement between said disk and wheel, and a brake arranged to arrest the movements of said disk and of the shaft driven thereby, when the pressure of the said disk against said wheel is relieved.

4. The combination, with a shaft to be driven and a sleeve secured to said shaft, of an electric motor comprising a stationary field-magnet and an armature, forming part of a wheel which has a hub mounted loosely on said sleeve, a clutch-disk rotatively connected with said sleeve, but adapted to slide thereon into or out of engagement with said wheel, and an arm or lever for pressing said disk into frictional contact with said wheel, when desired.

5. The combination, with a shaft to be driven and a sleeve secured to said shaft, of an electric motor comprising a stationary field-magnet and an armature, forming part of a wheel which has a hub mounted loosely on said sleeve, a clutch-disk rotatively connected with said sleeve, but adapted to slide thereon into or out of engagement with said wheel, an arm or lever for pressing said disk into frictional contact with said wheel, when desired, and a spring-pressed brake to arrest the movements of the said disk and shaft when the pressure of the said arm or lever on said disk is relieved.

6. The combination, with the shaft E and the sleeve H, fixed thereto, of the stationary field-magnet D, the rotary armature-wheel B, having the hub *b* loosely fitting said sleeve, the clutch-disk L, keyed to said sleeve and having the button M, and the spring-operated lever O, provided with a brake G.

7. The combination, with the arm A, having the hub $a$ and bracket F, of the shaft E, extending through said hub and provided with the sleeve H, the stationary field-magnet D, secured to said hub $a$, the rotary armature-wheel B, having hub $b$ loosely fitting said sleeve, the clutch-disk L, free to slide on said sleeve, but keyed thereto to rotate therewith, the bell-crank clutch-lever O, pivoted to said bracket and provided with the brake G, and the spring $w$ to operate said lever.

In testimony whereof I affix my signature in presence of two witnesses.

PHILIP DIEHL.

Witnesses:
J. G. GREENE,
L. L. BURRITT.